No. 690,489. Patented Jan. 7, 1902.
G. R. VANDER WEE.
TRACING AND CUTTING IMPLEMENT.
(Application filed July 27, 1900.)

(No Model.)

Witnesses:
J. L. Edwards Jr.
W. H. J. Hodgett

Inventor:
George R. Vander Wee.
By his Attorney,
F. H. Richards.

THE NORRIS PETERS CO., PHOTO-LITHO., WASHINGTON.

UNITED STATES PATENT OFFICE.

GEORGE R. VANDER WEE, OF NEW YORK, N. Y.

TRACING AND CUTTING IMPLEMENT.

SPECIFICATION forming part of Letters Patent No. 690,489, dated January 7, 1902.

Application filed July 27, 1900. Serial No. 24,995. (No model.)

*To all whom it may concern:*

Be it known that I, GEORGE R. VANDER WEE, a citizen of the United States, residing in the borough of Manhattan, in the county of New York and State of New York, have invented certain new and useful Improvements in Tracing and Cutting Implements, of which the following is a specification.

My invention relates to tracing and cutting implements, and more particularly to that class of those devices employed for tracing off and cutting out patterns and designs in cloth or paper, although it is not limited to such use, for it may be employed with other kinds of material—as, for instance, wood, sheet metal, leather, lace, &c. Heretofore these implements have had many defects, and while it was not difficult to trace the pattern or design, yet trouble has been caused by the failure of the cutter to act properly and no provision has been made for renewing the cutting edge after it has become dull without removing the cutter and resharpening it. Furthermore, in these devices the cutter does not operate with what is known as a "shear" cut, and consequently it is apt to pucker the material and have a dragging action thereon, thereby throwing the traced portion out of line and often spoiling the work.

It is the object of my invention to provide a tool in which all of these defects and others unnecessary to mention may be overcome and one in which a stationary cutter having a series of cutting edges is employed, the cutter being so mounted that it may be released and turned to bring a new cutting edge into place and then locked to prevent it from movement.

A further object of the invention is the provision of a rotary disk located adjacent to the stationary cutter and a series of pins coöperating with said disk and serving to aid the implement in its advancing movement upon the material, said disk and pins constituting a feed-wheel, an edge of the disk permitting the cutter to act upon said material with a shear cut, and thereby easily to sever the same.

A further object of the invention is the provision of a tracing-wheel and a carrier provided with a stationary cutter and a revoluble feed wheel or disk, said carrier being adjustable toward and from the tracing-wheel to conform to the desired width of the seam.

Figure 1:
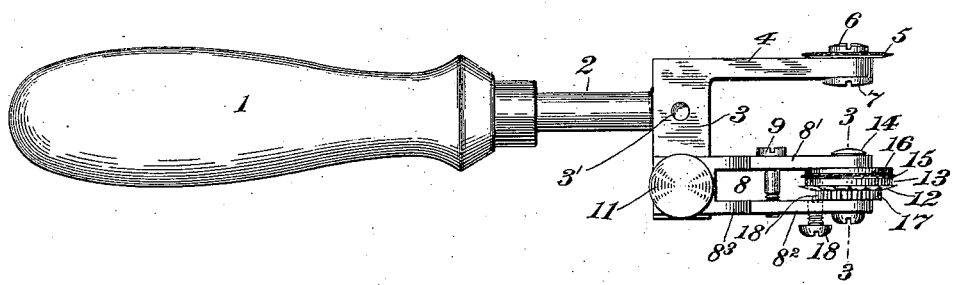
Figure 2:
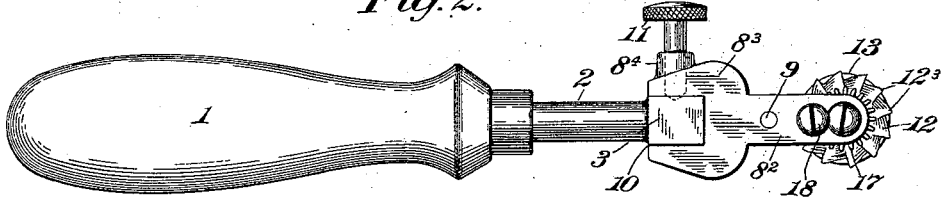
Figure 3:
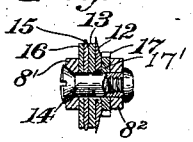
Figure 4:
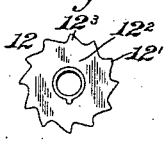
Figure 5:
Figure 6:
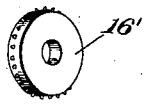

In the accompanying drawings, Figure 1 is a plan view of one form of my improved tracing and cutting implement. Fig. 2 is a side elevation of said implement. Fig. 3 is a longitudinal vertical section on line 3 3, Fig. 1, of the cutting and feeding devices. Fig. 4 is a rear side elevation of the cutting disk or wheel detached. Fig. 5 is a side elevation, partially broken away, of an additional stock or handle to which the carrier in which the cutting and feeding devices are mounted may be attached when it is desired to dispense with the tracing-wheel; and Fig. 6 is a perspective view of a modification of the feeding device.

Like numerals refer to like parts throughout the several views.

Referring to the drawings, the numeral 1 designates the handle of my improved implement, which in the form thereof illustrated in Figs. 1 and 2 is secured to a stem 2, having a cross-bar 3 at its forward end provided with a longitudinal side extension 4, on which a marking or tracing wheel 5 is mounted for rotation in any desired manner—for instance, upon the shank of a bolt 6, secured in position by a nut 7, as illustrated in Fig. 1.

Designated by the numeral 8 is a bifurcated carrier, the arms $8'$ $8^2$ of which may be adjusted by a screw 9, and to afford strength this carrier is provided at one end with an enlarged portion $8^3$, having a socket 10 for the reception of the cross-bar 3, a pin 11, fitted in a socket $8^4$ of said enlarged portion, serving adjustably to secure the carrier to the cross-bar, and the latter being provided with a series of indentations or recesses $3'$ to receive the point of said pin. (See Fig. 1.)

Mounted between the free ends of the arms $8'$ $8^2$ of the carrier is a combined cutting and feeding implement, which will now be described, said implement being composed of a stationary cutter in the form of a disk or wheel 12, having a series of individual cutting-teeth $12'$ and a flat back $12^2$. These cutting-teeth are beveled off to form sharp cutting-points $12^3$, and they coöperate with a disk 13 of less diameter than the cutter and loosely mounted on a bolt or journal member 14, secured between the arms of the carrier adjacent to the flat back 12² of said cutter.

Mounted upon the bolt 14 is a toothed feed-wheel 15, the diameter of which is a little less than that of the cutter 12, and this feed-wheel is located between the disk 13 at one side and a disk 16 at the other side, as illustrated in Fig. 3, or, as shown in Fig. 6, the disk and feed-wheel 16' may be made integral, if desired, to accomplish the same purpose.

A toothed adjusting-wheel 17, having a hub 17', to which the cutter 12 is splined, is held stationary by a pin 18, having a reduced point 18', adapted to be inserted between any two teeth thereof, and when a cutting edge has become dull this pin is removed and the cutter rotated to bring a sharp cutting edge into place, when it is again secured by said pin.

Any suitable device may be substituted for the wheel 17, or said wheel may be omitted and the pin be made to engage the cutter directly, if desired.

In Fig. 5 I have illustrated an additional handle 19, having a stem with a rectangular end 19', to which the carrier 8 may be secured when it is desired to use the implement without the tracing-wheel 5.

In the operation of my device when it is desired to copy the outline of a pattern or design for the purpose of reproducing the same on the material upon which the design is superposed, the handle 1 is grasped, and the implement is moved over the pattern to cause the tracing-wheel 5 to follow the same and the teeth of said wheel to mark off or indent the underlying fabric or other material and copy the pattern thereon. If it is desired to cut the material at the same time the line of perforations is formed therein, the carrier 8 is adjusted on the cross-bar 3 to conform to the desired width of the seam, and the feed-wheel and cutter are pushed over the material and sever the same on lines corresponding to the movement of the tracing-wheel 5, which, as before stated, follows the line of the pattern or other design. When it is desired to sever without tracing the material, the carrier 8 is removed from the cross-bar 3 and is placed upon the angular projection 19' of the handle 19, and by manipulating said handle the cutter and feed wheel will be pushed over the material to sever the same on the marked or perforated line made by the tracer 5.

It will be observed by reference to Figs. 1, 2, and 4 that the knife-point or cutting edge of the cutter is so formed that it cuts on its center or slightly back of the center, thereby preventing the cutter from working until after one of the projecting points of the feed-wheel is inserted in the material to be cut, in virtue of which buckling of the material or slipping of one layer upon the other layer is prevented.

By making the feed-roller in either of the forms shown of less diameter than the cutter it will be observed that the space between the top of said roller and the cutter is enough to permit the ready admission of the material being severed to the periphery of the feed-roller without interference with the cutter.

Whether the feed-roller be made in sections or one piece is immaterial, for in either form thereof the teeth or sharpened points on its periphery pass through both thicknesses of the material, bind them together, and prevent the top layer from creeping or slipping on the lower layer. Feed-rollers may be provided on both sides of the cutter, if desired; but generally one is all that is necessary.

In cutting paper the feed-roller may have a smooth periphery, for in operating upon such material no points or teeth are necessary.

By adjusting the arms of the carrier 8 by means of the screw 9 the tension thereof on the heads of the bolt 14 may be regulated as desired.

Many changes may be made in the details of my invention, and it is not limited to the precise devices shown and described.

Having thus described my invention, I claim—

1. In an implement of the class described, the combination, with a handle, of a carrier secured thereto; a journal member in said carrier; a normally stationary cutter mounted upon an adjusting-wheel to turn about said member; and a revoluble feed-wheel adjacent to said cutter and journaled on the member.

2. In an implement of the class described, the combination with a handle, of a carrier secured thereto; a journal member in said carrier; a normally stationary but adjustable cutter mounted to turn about said member; a revoluble feed-wheel adjacent to said cutter and journaled on the member; and an adjusting-wheel also journaled on the member.

3. In an implement of the class described, the combination with a handle, of a bifurcated carrier secured to said handle; a normally stationary but adjustable cutter having a series of individual cutting-teeth mounted between the arms of said carrier; an adjusting-wheel mounted adjacent thereto; and a feed-wheel of less diameter than the cutter and mounted adjoining said cutter.

4. In an implement of the class described, the combination, with a handle provided with a stem having a rectangular portion, of a bifurcated carrier secured to said rectangular portion; a stationary cutter located between the arms of said carrier; a toothed wheel connected with said cutter to prevent its rotation; a bolt uniting the ends of the arms of the carrier; and a feed-wheel of less diameter than the cutter and loosely mounted upon the bolt.

5. In an implement of the class described, the combination, with a bifurcated carrier and with means for supporting the same, of a stationary cutter having a series of cutting edges; toothed wheel splined thereto, a locking-pin engaging said teeth for preventing the cutter from rotation; a feed wheel or disk located adjacent to the cutter; and a bolt uniting the ends of the carrier and upon which the feed-wheel and cutter are mounted.

6. In combination with a bifurcated carrier, a cutter having a series of cutting edges; a toothed device upon the hub of which the cutter is splined; a pin located in an arm of the carrier and adapted to engage said toothed device; a feed-roll located adjacent to the cutter; and a bolt located in the ends of the carrier-arms and upon which the feed-wheel and cutter are mounted.

7. In an implement of the class described, the combination with a carrier, of a tracing-wheel mounted in one portion thereof; a normally stationary cutter adjustable to present a new cutting-surface mounted in said carrier at a distance from the tracing-wheel equal to the width of the material to be left to form a seam; and a feed-wheel mounted adjoining said cutter.

8. In an implement of the class described, the combination with a carrier, of a tracing-wheel mounted in one portion thereof; a normally stationary cutter adjustable to present a new cutting-surface mounted in said carrier at a distance from the tracing-wheel equal to the width of the material to be left to form a seam; and a feed-wheel mounted adjoining said cutter, said feed-wheel being of less diameter than the cutter and having a series of penetrating points.

9. In an implement of the class described, the combination with a carrier, of a tracing-wheel mounted in one portion thereof; a normally stationary cutter adjustable to present a new cutting-surface mounted in said carrier at a distance from the tracing-wheel equal to the width of the material to be left to form a seam; an adjusting-wheel mounted adjacent to said stationary cutter; and a feed-wheel mounted adjoining said cutter.

10. In an implement of the class described, the combination with a carrier, of a tracing-wheel mounted in one portion thereof; a normally stationary cutter provided with a series of individual cutting-teeth flat on one side and beveled off on the other side to form sharp cutting points and edges and mounted in said carrier at a distance from the tracing-wheel equal to the width to be left to form the seam; an adjusting-wheel mounted adjacent to said stationary cutter; and a feed-wheel mounted adjacent to the flat side of the cutter.

GEORGE R. VANDER WEE.

Witnesses:
FRED. J. DOLE,
WM. H. BLODGETT.